US006559455B2

(12) United States Patent
Nash

(10) Patent No.: US 6,559,455 B2
(45) Date of Patent: May 6, 2003

(54) MULTIPLE ULTRAVIOLET SENSITIVE PATCHES ON A SINGLE STRIP AND A PROCESS FOR MANUFACTURING THEREOF

(76) Inventor: Alan E. Nash, 50 Green St., Canton, MA (US) 02021

(*) Notice: Subject to any disclaimer, the term of this patent is extended or adjusted under 35 U.S.C. 154(b) by 25 days.

(21) Appl. No.: 09/739,585

(22) Filed: Dec. 18, 2000

(65) Prior Publication Data

US 2002/0074514 A1 Jun. 20, 2002

(51) Int. Cl.[7] ................................................. G01N 5/00
(52) U.S. Cl. ................................. 250/474.1; 250/473.1
(58) Field of Search ............................. 250/474.1, 473.1, 250/484.3, 484.4, 482.1, 372, 461.1, 461.2, 492.1; 428/35.7, 36.9

(56) References Cited

U.S. PATENT DOCUMENTS 4,308,459 A * 12/1981 Williams .................... 250/474
5,520,760 A *  5/1996 Freedman ................... 156/152
5,807,619 A *  9/1998 Freedman .................. 428/35.7

* cited by examiner

Primary Examiner—Constantine Hannaher
Assistant Examiner—Otilia Gabor
(74) Attorney, Agent, or Firm—Steven N. Fox, Esq.

(57) ABSTRACT

The present invention is an article of manufacture for use in alerting a person of exposure to an excessive amount of ultraviolet radiation. In one embodiment, the article of manufacture comprises a first strip comprising a backing member and first and second patches. Each of the first and second patches comprise an ultraviolet sensitive material releasably disposed upon the backing member. Each of the first and second patches comprise first and second outside edges and an inside edge. The first and second patches are nested and adjoined along said inside edges of the first and second patches, respectively. The ultraviolet sensitive material is adapted to change from a first color to a second color when exposed to an excessive amount of ultraviolet radiation. In operation, a person may remove the first and second patches from the backing member as desired and apply the patch to an area of exposed skin. The person is alerted of exposure to an excessive amount of ultraviolet radiation when the UV sensitive coating is changing from the first color to the second color.

9 Claims, 8 Drawing Sheets providing a continuous sheet of material, said continuos sheet of material having a longitudinal axis and a latitudinal axis, said continuos sheet of material further comprising a continuous ultraviolet coated material releasably connected to a continuous backing member.

↓ a first cutting operation of said continuous sheet with a rotary cutting die to produce a first strip comprising a plurality of ultraviolet sensitive patches releaseably connected to a first elongated backing member.

↓ a second cutting operation of said continuous sheet with a cutting die to produce a second strip comprising a plurality of ultraviolet sensitive patches releaseably connected to a second elongated backing member.

FIG. 8

The first cutting operation comprises the step of rotating said rotary cutting die to make a first complete cut along said latitudinal axis of said sheet, a first kiss-cut along said longitudinal axis of said sheet, and a second complete cut along said latitudinal axis of said sheet to thereby produce said first strip having said plurality of ultraviolet sensitive patches releaseably connected to said first elongated backing member.

↓ second cutting operation comprises the step of rotating of said rotary cutting die to make a third complete cut along said latitudinal axis of said sheet, a second kiss-cut along said longitudinal axis of said sheet, and a fourth complete cut along said latitudinal axis of said sheet to thereby produce said second strip having said plurality of ultraviolet sensitive patches releaseably connected to said second elongated backing member.

FIG. 9

MULTIPLE ULTRAVIOLET SENSITIVE PATCHES ON A SINGLE STRIP AND A PROCESS FOR MANUFACTURING THEREOF

FIELD OF THE INVENTION

The present invention relates generally to the field of ultraviolet (UV) detection devices. More particularly, the present invention relates to UV detection devices that are attached to a person.

BACKGROUND OF THE INVENTION

It is well documented that excessive exposure to the sun's ultraviolet radiation may cause health problems, including burns, melanoma, and premature wrinkling of the skin. Conventional devices have been developed which are connected to the body of the person to detect the amount of exposure to ultraviolet radiation. Such conventional devices use a ultraviolet sensitive coating which changes color upon exposure to a given amount of ultraviolet radiation. Such conventional devices are difficult and costly to manufacture, including, a significant amount of waste during the manufacturing process.

OBJECTS OF THE INVENTION

One object of the present invention was to provide an article of manufacture for use by a person to detect an excessive amount of ultraviolet radiation and that can be easily used and attached to the skin of the person; and Another object of the present invention was to provide an article of manufacture for use by a person to detect an excessive amount of ultraviolet radiation and that can be manufactured in a cost effective manner with substantially no waste.

SUMMARY OF THE PRESENT INVENTION

The present invention is an article of manufacture for use in alerting a person of exposure to an excessive amount of ultraviolet radiation. The article of manufacture comprises a first strip comprising a backing member and first and second ultraviolet sensitive patches. Each of the first and second patches comprise first and second outside edges and an inside edge. In one embodiment, the inside edges of the first and second patches are each preferably non-planar. The first and second patches are nested and adjoined along said inside edges of the first and second patches, respectively, resulting in substantially zero waste. The ultraviolet sensitive material is adapted to change from a first color to a second color when exposed to an excessive amount of ultraviolet radiation. In operation, a person may remove the first and second patches from the backing member as desired and apply the patch to an area of exposed skin. The person is alerted of exposure to an excessive amount of ultraviolet radiation when the UV sensitive coating changing from the first color to the second color.

A process for manufacturing an article of manufacture generally comprising the first step of providing a continuous sheet of material having a longitudinal axis and a latitudinal axis. The continuous sheet of material further comprising a continuous ultraviolet coated material releasably connected to a continuous backing member. The process further comprises a first cutting operation to cut the sheet using a rotary cutting die to produce a first strip comprising a first plurality of ultraviolet sensitive patches releaseably connected to a first backing member. The process further comprises the step of a second cutting operation to cut the sheet using the rotary cutting die to produce a second strip comprising a second plurality of ultraviolet sensitive patches releaseably connected to a second backing member.

The first cutting operation comprises the step of using the rotary cutting die to make a first complete cut along said latitudinal axis of the sheet, a first kiss-cut along the longitudinal axis of the sheet, and a second complete cut along the latitudinal axis of the sheet to thereby produce the first strip having the first plurality of ultraviolet sensitive patches releaseably connected to the second backing member.

The second cutting operation comprises the step of using the rotary cutting die to make a first complete cut along said latitudinal axis of the sheet, a first kiss-cut along the longitudinal axis of the sheet, and a second complete cut along the latitudinal axis of the sheet to thereby produce a second first strip having the first plurality of ultraviolet sensitive patches releaseably connected to the first backing member.

BRIEF DESCRIPTION OF THE DRAWINGS

The following detailed description of the invention will be better understood with reference to the accompanying drawings in which:

FIGS. 8 and 9 are high level flow charts showing a first embodiment of the process of the present invention.

DETAILED DESCRIPTION OF THE INVENTION

Figure 1:
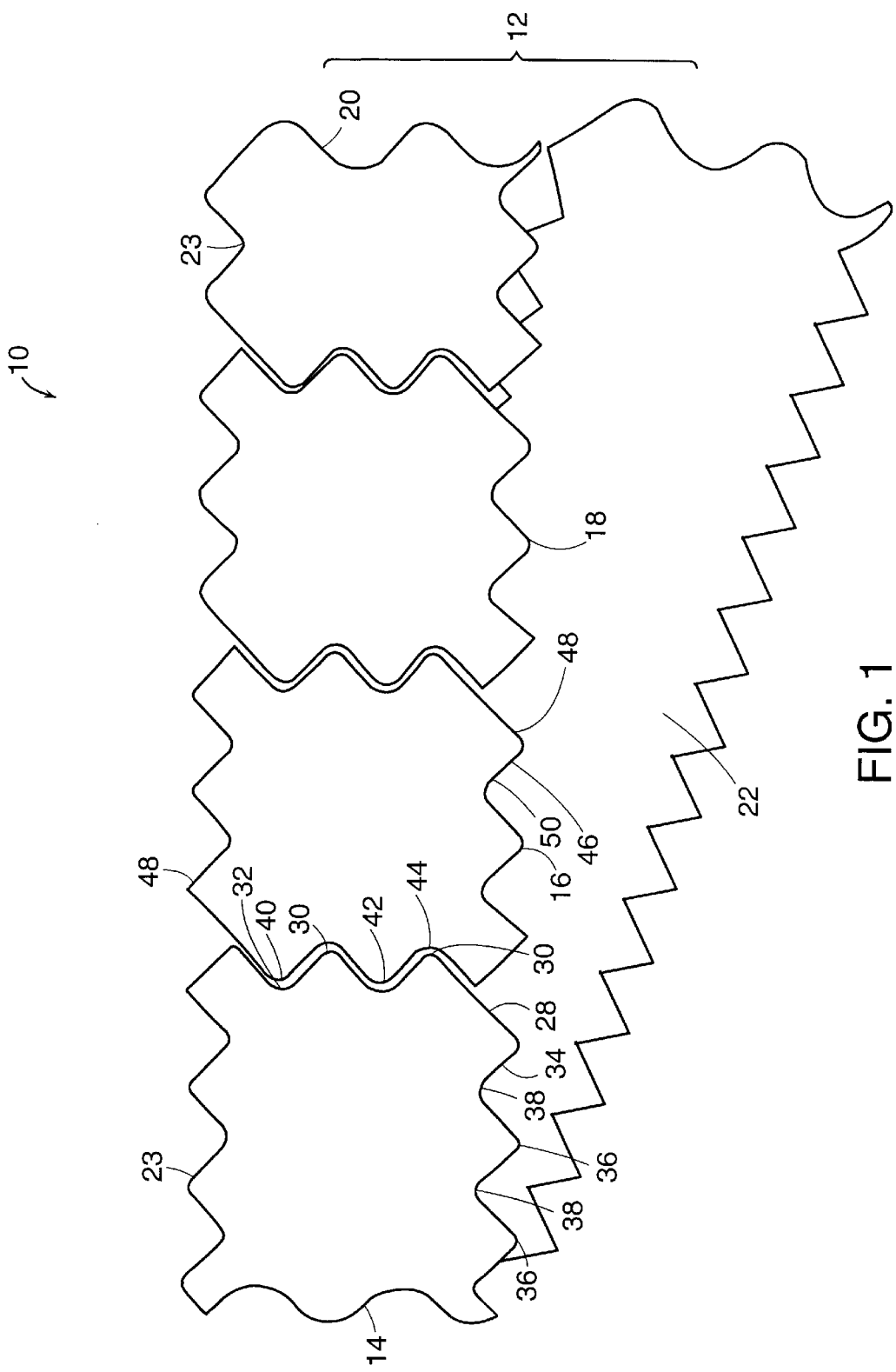
FIG. 1 is a perspective view of a first embodiment of the present invention showing a single strip having a plurality of UV sensitive patches releaseably attached to a backing member.
Figure 2:
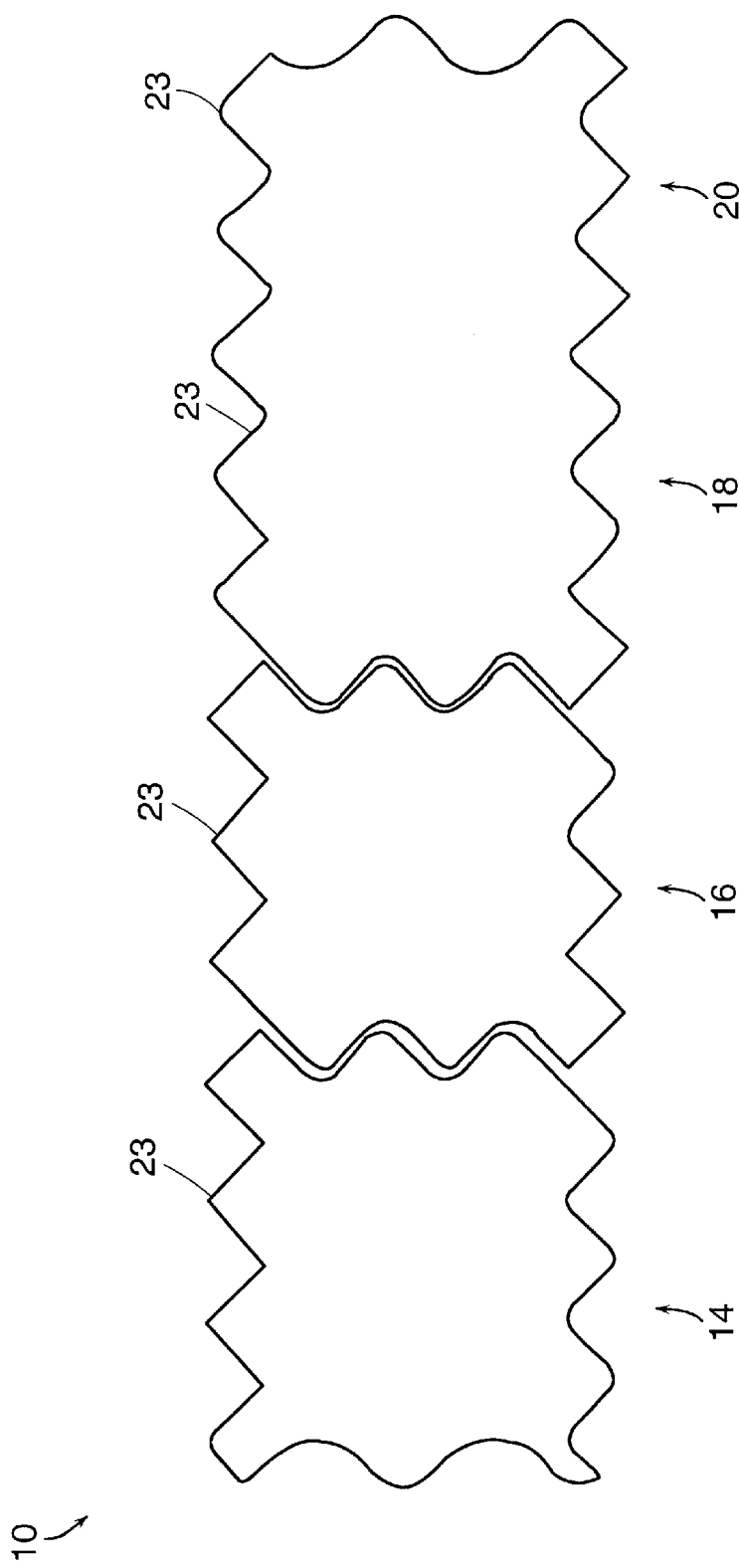
FIG. 2 is a top plan view showing a plurality of UV sensitive patches releaseably attached to a backing member.
Figure 3:
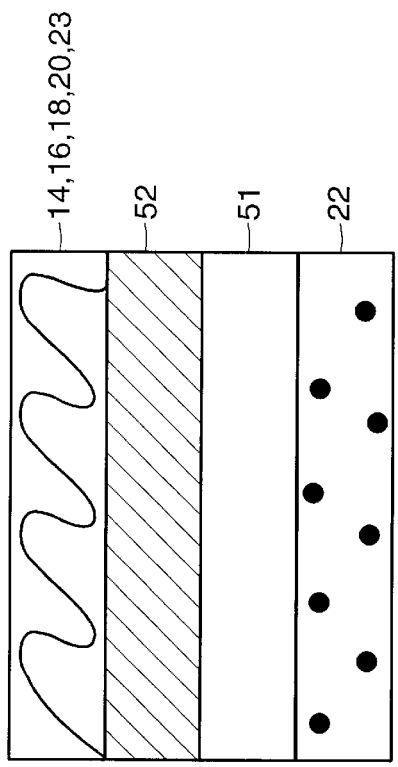
FIG. 3 is a cross-section view of the single strip of the present invention.
Figure 5:
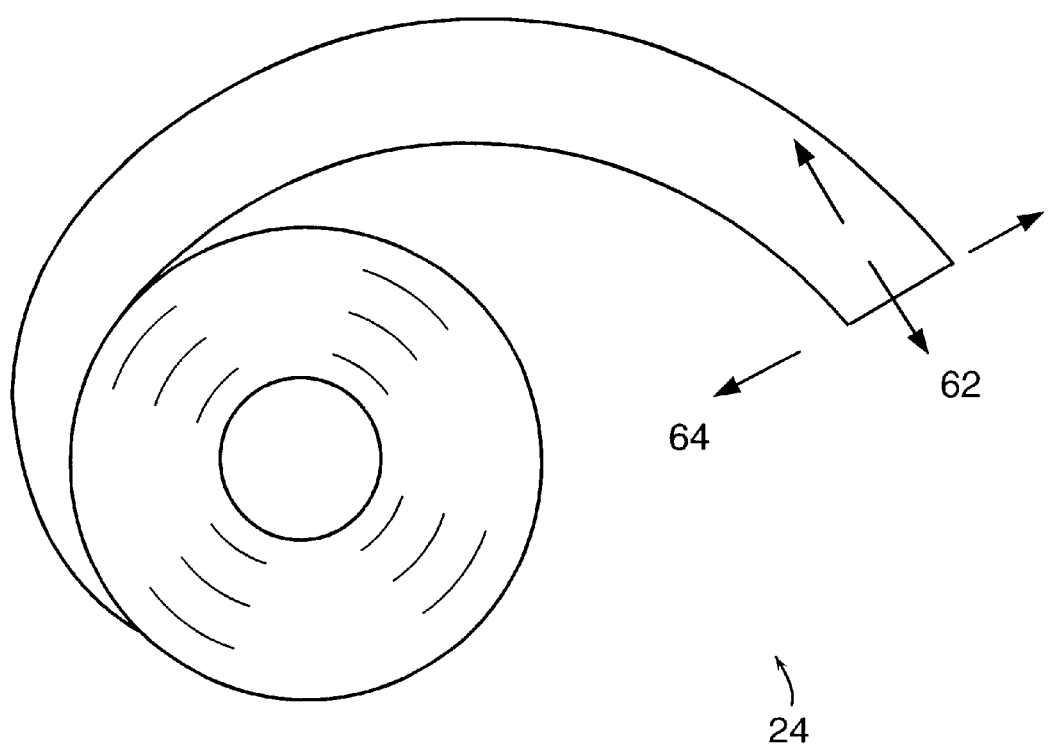
FIG. 5 is a perspective* view of a continuous roll of material used in connection with the manufacture of the present invention.
Figure 6A:
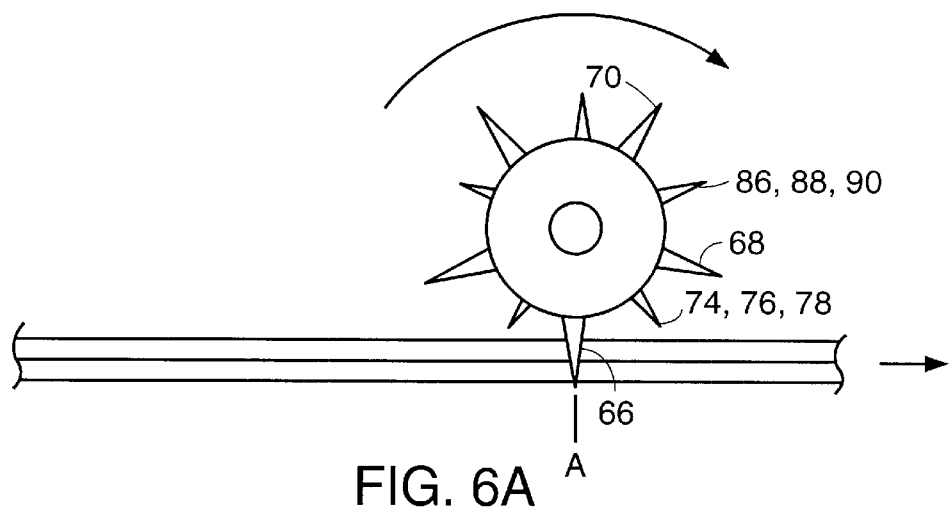
FIGS. 6A–6C are illustrative view showing the rotary cutting die positions in the first complete cutting operation and the second complete cutting operation.
Figure 6B:
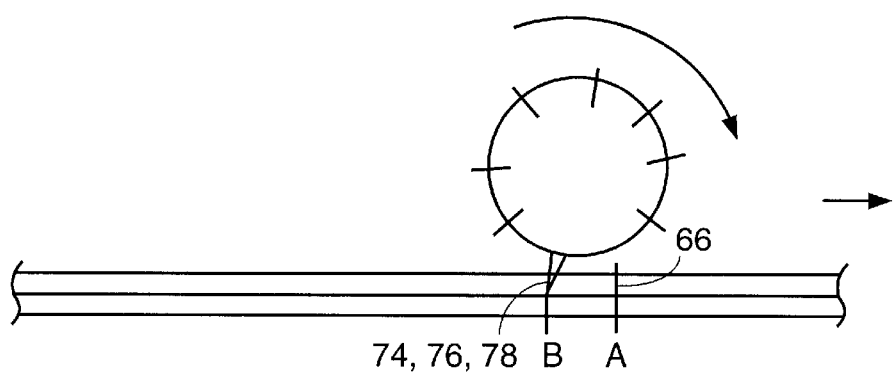
Figure 6C:
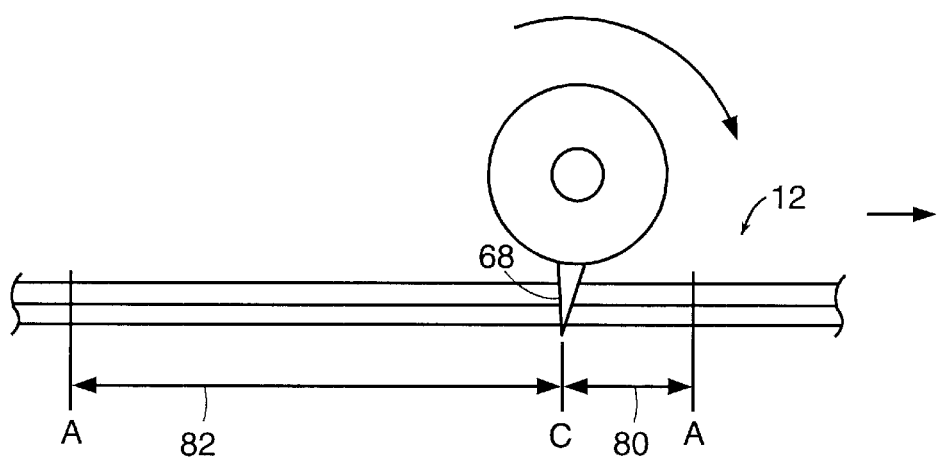
Figure 7:
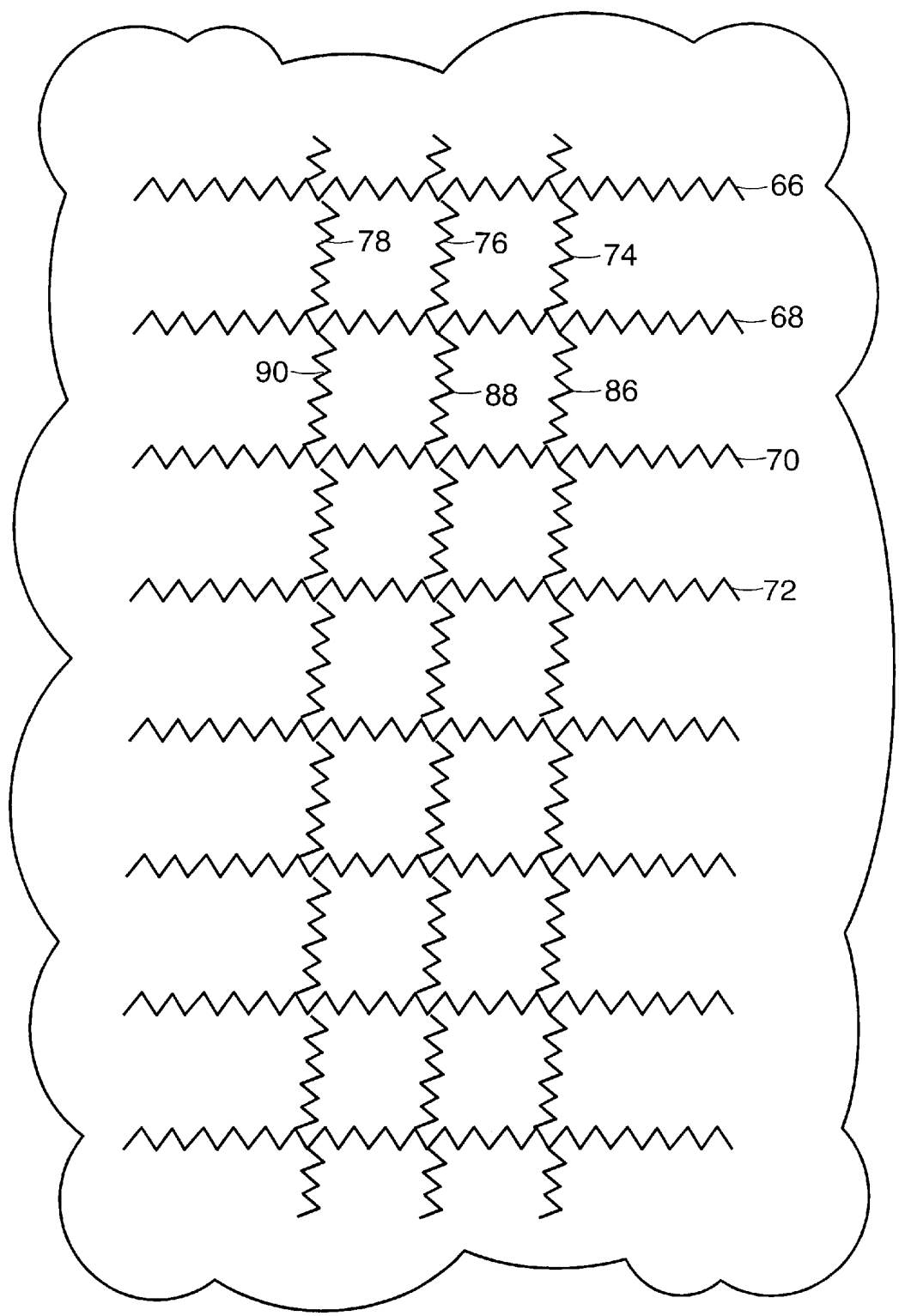
FIG. 7 is a illustrative view showing one pattern of the rotary cutting die used in connection with the fabrication of the strip of the present invention.
Figure 10:
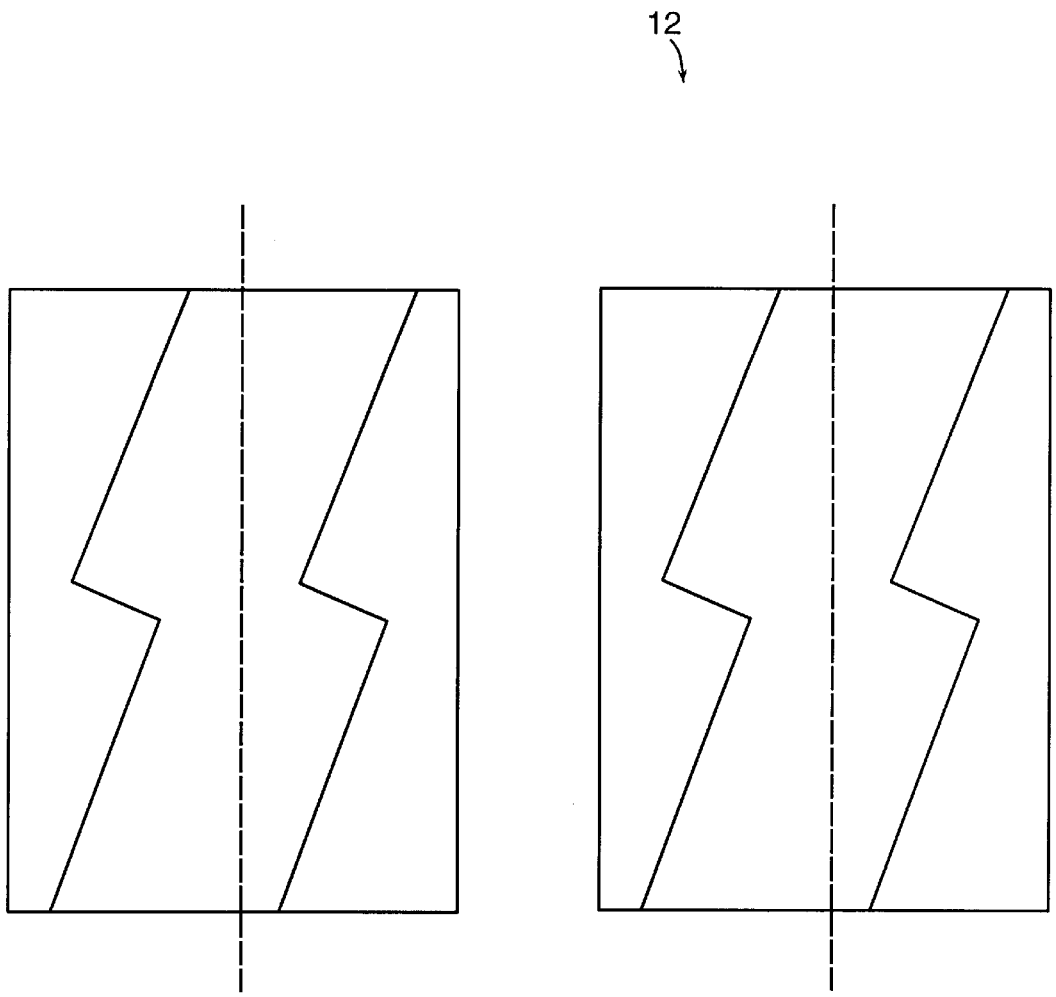
FIG. 10 is a top plan view showing an alternative shape of the single strip of the present invention having patches with planar surfaces.

Referring to FIGS. 1–3, an article of manufacture 10 of the present invention is shown for use in alert the person of exposure to an excessive amount of ultraviolet radiation. In one embodiment, the article 10 comprises a strip 12 having a patch 14, a patch 16, a patch 18, and a fourth patch 20, releasably attached or disposed upon an elongated backing member 22. Multiple strips 12 are manufactured from a continuous roll of material 24 (FIG. 5) fed through a cutting die 26 (to be described) of a feeding machine (not shown). The feeding machine is a web bandage envelope machine available from a variety of suppliers.

Patches 14, 16, 18 and 20 each comprise an ultraviolet sensitive material 23 releasably connected with the backing member 22. The ultraviolet sensitive material 23 being adapted to change from a first color to a second color indicative of the maximum amount of exposure to ultraviolet radiation. Patches 14, 16, 18 and 20 are of similar design. Patch 14 comprises a first non-planar edge 28 having peaks 30 and valleys 32 and a second non-planar edge 34 having peaks 36 and valleys 38. Patch 14 comprises a third non-planar edge 40 having peaks 42 and valleys 44 and a fourth non-planar edge 46 having peaks 48 and valleys 50. Patches 14 and 16 are nested and adjoined along the first and third non-planar edge 28 and 34, respectively, resulting in substantially zero waste.

In operation, the patches 14 and 16 may be removed as needed from the backing member 22 and adhesively attached to the skin of a person to thereby alert the person that the person has been exposed to said maximum amount of ultraviolet radiation upon the patches 14 and 16 changing from a first color to a second color.

As shown by FIG. 3, the continuous roll comprises the backing member 20, a release material or layer 51, an adhesive coating 52, and the UV sensitive material 22. The release layer 20 is preferably made from a well known Silicon based material. The adhesive coating 22 is preferably made from a human-safe pressure sensitive adhesive widely available from suppliers The UV sensitive material 24 is preferably made from a paper based material treated with an UV sensitive coating widely available from suppliers.

Figure 4:
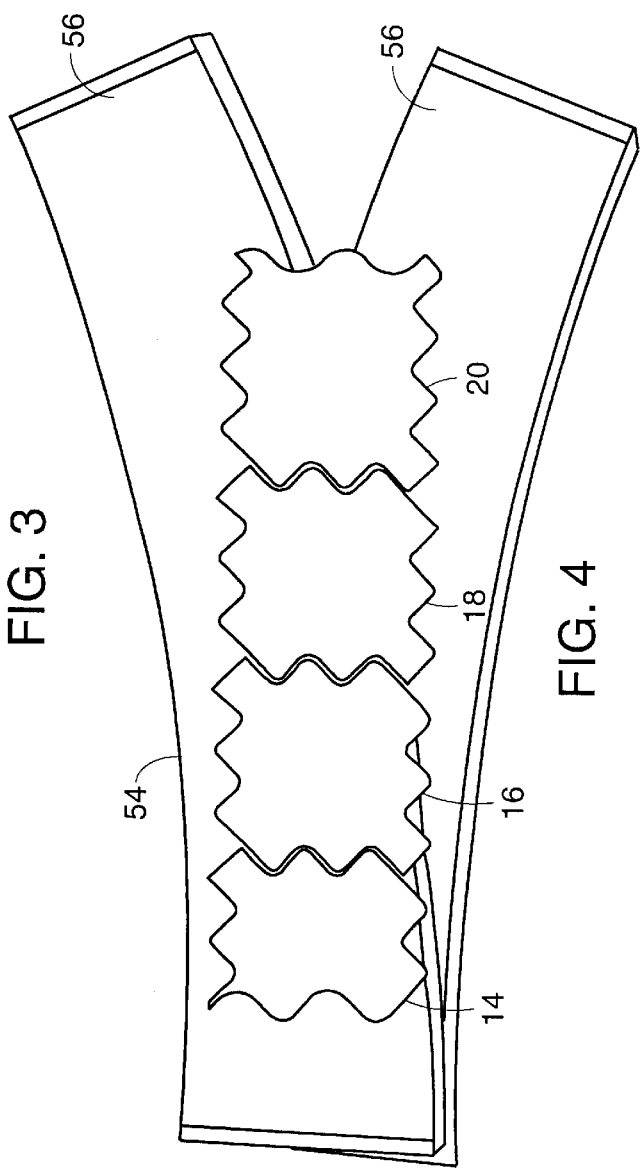
FIG. 4 is a perspective view of a second embodiment of the present invention showing the single strip disposed within a sealed enclosure.

Referring to FIG. 4, wherein the article of manufacture 10 further comprises a sealed enclosure 54 adapted to contain the strip 10. The sealed enclosure 54 is of a design similar to that of enclosures used in connection with conventional bandages and includes a tab 56 enabling a person to open the sealed enclosure 54.

Referring to FIGS. 5, 6A–6C and 7, wherein the cutting die 26 comprises a cutting pattern 60 used in connection with fabrication of the article 10. Cutting die 26 is a rotary cutting die. The roll 24 is oriented such that is controllable fed through the rotary cutting die 26 of the feeding machine (not shown). The roll 24 has a width that is preferably 2.85 inches and is defined by a longitudinal axis 62 and a latitudinal axis 64.

The rotary cutting die 26 comprises complete cut cutting edge 66, 68, 70, and 72, each of which extend a distance equivalent to the width of the roll 24. Th rotary die 26 further comprises a kiss-cut cutting edges 74, 76 and 78.

Upon the feeding of the roll 24 through the rotating rotary cutting die 26 an initial complete cut by the complete cutting edges 66 along the longitudinal axis 64 of the roll 24 occurs which penetrates through the UV coating material 23 and the backing member 22. Upon further rotation of the rotary cutting die 26, a kiss-cut by the kiss-cut cutting edges 74, 76, and 78 occurs which penetrates through the UV coating material 23 but not through the backing material 222 to form a patches 14, 16, 18, and 20 releasably disposed on the first strip 12. Upon further rotation of the rotary cutting die 26, a complete cut by complete cutting edges 68 is made which penetrates through the UV coating material 23 and the backing material 22 to release the first strip 12 and form one-half of a second strip 84. Upon further rotation of the rotary cutting die 26, a kiss-cut by the kiss-cut cutting edges 86, 88, and 90 which penetrate through the UV coating material 23 but not through the backing material 22 to form patches 14, 16, 18, and 20 releasably disposed on the second strip 84. Upon further rotation of the rotary cutting die 26, a complete cut by complete cutting edges 70 is made which penetrates through the UV coating material 23 and the backing material 22 to release the second strip 84 and form one-half of the strip 84.

This distance between complete cutting edges 66 and 68 range from 0.7383 inches to 0.7583 inches, and preferably 0.7483 inches in length. This distance between complete kiss-cut cutting edges 74 and 76 and 76 and 78 range from 0.7383 inches to 0.7583 inches, and preferably 0.7483 inches in length having separated patches 14, 16, 18, and 20 that are 0.6400 inches to 0.6600 inches, and preferably 0.6500 inches in width.

Rotation of the rotary cutting die 26 through the cutting operations of the first complete cut, followed by a kiss-cut, and then a second complete cut, results in the creation of the strip 12, wherein the first edge 28 of patch 14 has the peaks 30 and the valleys 32, and wherein the third edge 40 of patch 16 has the peaks 36 and the valleys 38, wherein the second edge 30 of patch 14 has peaks 42 and valleys 44, and the fourth edge 42 of patch 16 having peaks 48 and valleys 50. The distance from peaks 42 and 44 is in the range of 0.1525 inches to 0.1725 inches, preferably 0.1625 inches, and a peak 48 to peak 50 is from 0.1150 inches to 0.1350 inches, preferably 0.1250 inches.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. An article of manufacture for use in alerting a person of exposure to an excessive amount of ultraviolet radiation, the article of manufacture comprising: a first strip comprising a backing member and first and second patches each comprising an ultraviolet sensitive coating releasably connected with said backing member, each of said first and second patches comprising first and second outside edges and an inside edge; said first and second patches being nested and adjoined along said inside edges of said first and second patches, respectively, said ultraviolet sensitive material being adapted to change from a first color to a second color upon exposure to the excessive amount of ultraviolet radiation; whereby said first and second patches may be removed from said backing member and the person is alerted of exposure to the excessive amount of ultraviolet radiation when the UV sensitive coating changes from the first color to the second color.

2. The article of manufacture of claim 1, wherein said inside edges of said first and second patches are each non-planar.

3. The article of manufacture of claim 2, wherein said inside edge of said first patch comprises first and second peaks and first and second valleys.

4. The article of manufacture of claim 3, wherein said inside edge of said second patch comprises first and second peaks and first and second valleys.

5. The article of manufacture of claim 4, wherein said first and second peaks of said inside edge of said first patch are nested and adjoined within said first and second valleys of said inside edge of said second patch.

6. The article of manufacture of claim 5, wherein said backing member comprises a lower surface having a release material disposed thereon.

7. The article of manufacture of claim 6, wherein said first and second patches each comprise an adhesive material disposed upon said lower surface of said first and second patches, respectively.

8. The article of manufacture of claim 7, further comprises a second strip comprising second and third patches.

9. The article of manufacture of claim 8, further comprising a sealed enclosure adapted to retain said first and second strips.

* * * * *